June 8, 1965  E. K. KARLSSON  3,187,491
DUST DISPERSAL MEANS
Filed May 17, 1963
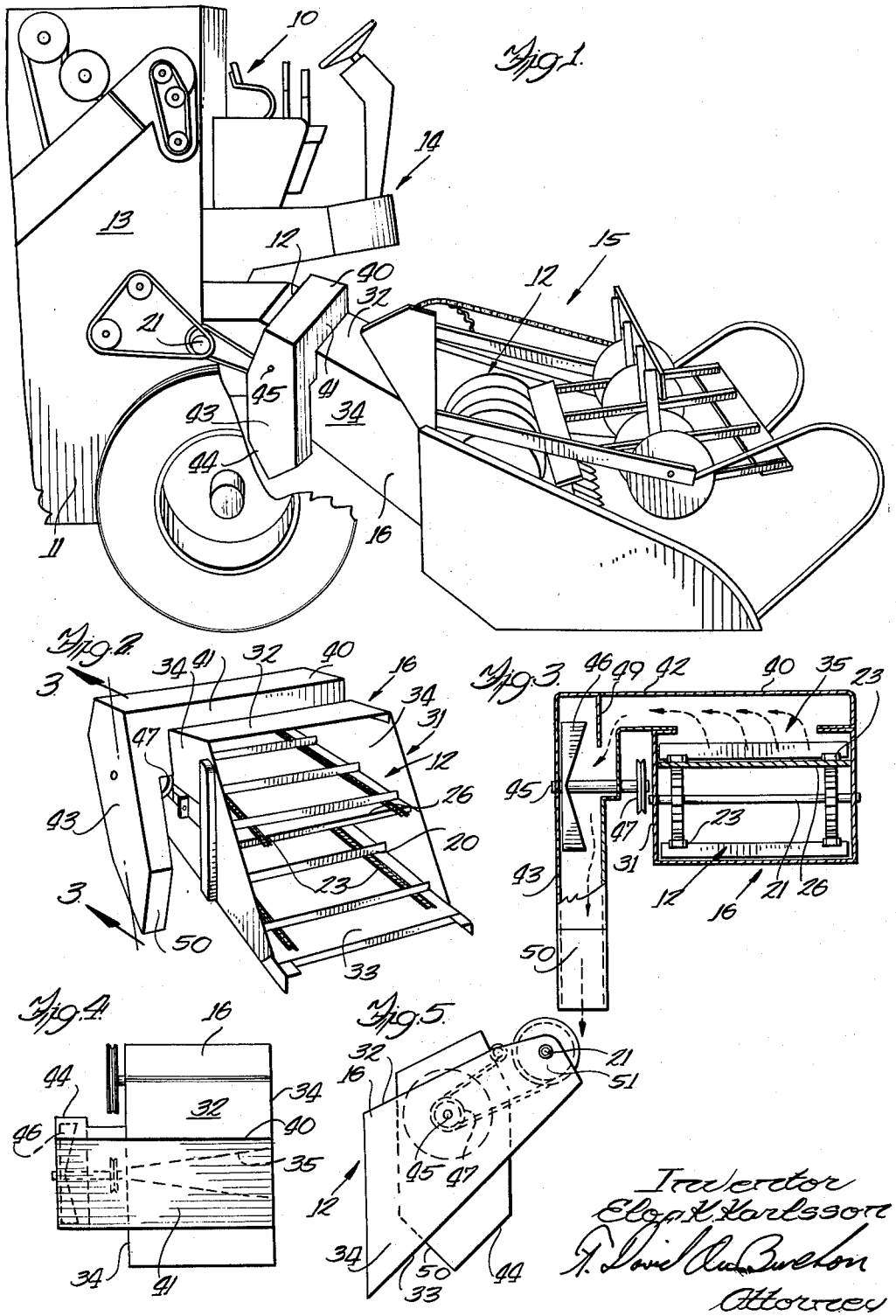

Referring now to FIGURE 2 which shows the feeder 16 having mounted therein a conveyor 20. Said conveyor 20 comprises an upper driven shaft 21, a lower driven shaft (not shown), a pair of endless chains 23 having connecting slats, a shelf 26 and means connected to the upper driven shaft exteriorly of the feeder through which the feeder is driven. The feeder casing itself comprises a tubular-shaped housing 31 having a top 32, a bottom 33, and vertical sides 34. This conveyor is generally utilized as an undershot feeder, that is, the material is conveyed along the lower portion or bottom 33 of the feeder by the moving slats 24. A wedge-shaped opening 35 is formed in said top 32 and as illustrated has its vertex on the right hand edge as seen by the operator from his platform. In other words, said wedge-shaped opening 35 extends laterally across the top 32 of the feeder 16 and diverges from right to left as seen by the operator from his platform. The purpose for so shaping this opening is to provide uniform dust removal across the conveyor. The velocity of the air drawn by the fan will be greatest at the vertex of the wedge-shaped slot and lowest at the opposite end where the area will be greatest.

United States Patent Office 3,187,491
Patented June 8, 1965

3,187,491
DUST DISPERSAL MEANS
Elof K. Karlsson, East Moline, Ill., assignor to International Harvester Company, Chicago, Ill., a corporation of New Jersey
Filed May 17, 1963, Ser. No. 281,106
2 Claims. (Cl. 56—20)

The present invention relates generally to improvements in combines and the like and more particularly to new and improved dust dispersal means for the combine feeder.

In the field of dust dispersal devices for combines it has been the general practice to employ means to remove the dust in the area of the cylinder and the straw rack. Although such devices have served the purpose, they have not proved entirely satisfactory under all conditions of service for the reason that a considerable amount of dust backs down the feeder and rises from the front of the feeder to envelop the operator causing an unhealthy atmosphere and interfering with his vision. Those concerned with the development of combines have long recognized the need for a means of eliminating this dust in the area of the operator. The present invention fulfills this need.

An object of the present invention is the provision of a combine having dust dispersal means to direct the dust in the area of the feeder away from the operator.

Another object is to provide a combine having dust dispersal means which will remove the dust in a uniform pattern across the feeder.

A further object of the invention is the provision of a dust dispersal means for removing dust from the combine feeder driven by the feeder conveyor.

Other objects and many of the appended advantages of this invention will be readily appreciated as the same becomes better understood by reference to the following detailed description when considered in connection with the accompanying drawings in which like reference numerals designate like parts throughout the figures thereof and wherein:

FIGURE 1 shows a perspective view of a combine including a feeder with a dust dispersal unit mounted thereon;

FIGURE 2 shows the combine feeder isolated from the machine having the dust dispersal unit mounted thereon;

FIGURE 3 is an enlarged cross-sectional view taken along lines 3—3 of FIGURE 2;

FIGURE 4 is a plan view of the feeder having the dust dispersal unit mounted thereon; and FIGURE 5 is a side view of the feeder having the dust dispersal unit mounted thereon.

Referring now to the drawings wherein like reference characters designate like or corresponding parts throughout the several views, there is shown in FIGURE 1 a combine generally designated 10 having a main body portion 11 which contains the rotating cylinder and concave (not shown), a material receiving opening 12 formed in said main body portion, a grain tank 13, an operating platform 14, a harvesting platform 15, and a feeder 16. When harvesting a standing crop such as wheat, it is cut and gathered by the harvesting platform and directed to the feeder 16. The material is then conveyed up the feeder 16 into the material receiving opening 12 and then to the elements such as the rotating cylinder and concave where it is thrashed. During the thrashing operation, a very large amount of dust is developed within the main body of the combine. In the past it has been the general practice to provide fans for disposing of this dust. However, these fans operate only within the main body portion of the combine and much of the dust developed in the combine back-feeds over the top of the conveyor within the feeder 16, coming out of the front of the feeder and from there it raises upwardly and envelops the operator on the combine, making it uncomfortable, unhealthy and obscuring his view.

A fan casing generally designated 40 is mounted on the tubular-shaped housing 31 of the feeder. Said fan casing 40 comprises a first elongated section 41 which extends laterally across the feeder and completely covers said wedge-shaped opening 35. The first elongated section 41 has a continuation designated 42 forming a closed duct portion extending outwardly from the right hand side of the feeder (see FIGURE 3). The fan casing 40 also includes a second elongated section 43, which extends downwardly from the closed duct portion, terminating in an exhaust port 44. As can be best seen in FIGURE 3, the second elongated section of the fan casing has parallel walls extending downwardly along the tubular housing of the feeder. A shaft 45 is journaled in these parallel walls and has an end portion extending through the inner wall into the area between said second elongated section and the tubular housing. This end section carries a pulley 47 or the equivalent for driving said shaft. The shaft 45 carries a fan 46 internally of said second elongated section which rotates in such a manner as to draw air from said first elongated section through the second elongated section and exhaust it through the port 44 formed in the lower portion of the latter.

As best seen in FIGURE 3 a baffle 49 is provided along the junction of the first and second elongated sections. This baffle functions to direct the air being drawn from the first section towards the fan and out the exhaust port 44. The bottom portion of the second elongated section has a deflector 50 which directs the air towards the rear of the combine and thus serves to prevent it from rising towards the operator.

Referring now to FIGURE 5 the shaft 21 of the conveyor 20 carries externally of the feeder 16 a pulley 51 which is aligned with the pulley 47 on the fan shaft 45. Thus a convenient and compact driving arrangement has been provided for the dust disposal fan by taking its drive directly from the driven shaft of the feeder.

Thus, it is seen that a dust disposal means has been provided for the feeder portion of a combine, it is conveniently driven from the drive shaft of said feeder and deposits the dust such that it will not rise into the area of the operator.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In a combine of the type having a main body portion housing the thrashing elements, a material receiving opening in said main body portion, a material feeder having an elongated tubular-shaped housing mounted on said main body portion about said opening, an undershot conveyor mounted in said tubular-shaped housing, the improvement therein which comprises: a transversely disposed wedge-shaped opening formed in the top portion of said tubular housing, a fan casing mounted on said tubular housing and communicating with the interior thereof through said opening and enclosing said opening, a downwardly directed exhaust port formed in said fan casing and a fan mounted in said fan casing adjacent the vertex of said wedge-shaped opening for drawing dust from the interior of said tubular housing and exhausting it through said fan casing port.

2. The invention as set forth in claim 1 wherein said fan casing comprises a first elongated section overlying said wedge-shaped opening including a continuation forming a closed duct portion that extends past the lateral edge of the tubular housing, and a second elongated section extending downwardly forming a continuation of said closed duct portion, a shaft journaled in said walls in said second elongated section including an end portion between said second elongated section and the adjacent tubular housing, said fan being mounted on said shaft interiorly of said second elongated section, and a pulley mounted on said end portion for driving said fan.

References Cited by the Examiner

UNITED STATES PATENTS

| | | | |
|---|---|---|---|
| 1,844,750 | 2/32 | Ellis | 56—20 |
| 2,832,187 | 4/58 | Johnson | 56—207 |
| 3,094,829 | 6/63 | Claas | 56—20 |

T. GRAHAM CRAVER, *Primary Examiner.*

ANTONIO F. GUIDA, *Examiner.*